United States Patent
Lin et al.

(10) Patent No.: US 9,712,993 B2
(45) Date of Patent: Jul. 18, 2017

(54) SYSTEM AND METHOD OF TRIGGER SERVICE

(71) Applicant: National Taiwan University, Taipei (TW)

(72) Inventors: Phone Lin, Taipei (TW); Chi-Wei Tseng, Taipei (TW); Hau Chen, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 388 days.

(21) Appl. No.: 14/290,335

(22) Filed: May 29, 2014

(65) Prior Publication Data

US 2014/0369258 A1    Dec. 18, 2014

(30) Foreign Application Priority Data

Jun. 14, 2013    (TW) .............................. 102121054 A

(51) Int. Cl.
| | |
|---|---|
| *H04W 8/18* | (2009.01) |
| *H04W 4/08* | (2009.01) |
| *H04W 4/14* | (2009.01) |
| *H04W 4/00* | (2009.01) |
| *H04W 28/02* | (2009.01) |

(52) U.S. Cl.
CPC .............. *H04W 8/18* (2013.01); *H04W 4/08* (2013.01); *H04W 4/14* (2013.01); *H04W 4/005* (2013.01); *H04W 8/186* (2013.01); *H04W 28/0215* (2013.01)

(58) Field of Classification Search
None
See application file for complete search history.

(56) References Cited

U.S. PATENT DOCUMENTS

| | | |
|---|---|---|
| 2004/0229601 A1 | 11/2004 | Zabawskyj et al. |
| 2005/0075106 A1 | 4/2005 | Jiang |

(Continued)

FOREIGN PATENT DOCUMENTS

| | | |
|---|---|---|
| CN | 1238894 | 12/1999 |
| CN | 101090510 | 12/2007 |

(Continued)

*Primary Examiner* — Yaotang Wang
(74) *Attorney, Agent, or Firm* — Muncy, Geissler, Olds & Lowe, P.C.

(57) ABSTRACT

The present application is provided a system and a method of a trigger service, which is applied between an end equipment group and an application service terminal. The end equipment group includes a plurality of end equipment, and the end equipment of the mobile equipment group is configured to sequentially connect to mobile network. Each of the end equipment is configured to keep connection with mobile network in a waiting period and suspended to access mobile network after the waiting time period. The application service terminal is configured to transmit a trigger message to the end equipment group, and the trigger message is repeatedly transmitted in a transmission period of the message arrangement. During the transmission period, each of the end equipment of each end equipment group in mobile network is configured to execute the requested order of the trigger message when it receives the trigger message from the application service terminal.

10 Claims, 12 Drawing Sheets

(56) References Cited

U.S. PATENT DOCUMENTS

| | | | | |
|---|---|---|---|---|
| 2012/0178379 A1* | 7/2012 | Chen | ................. | H04W 52/0206 |
| | | | | 455/68 |
| 2013/0143606 A1* | 6/2013 | Merlin | .............. | H04W 52/0209 |
| | | | | 455/458 |
| 2015/0050955 A1* | 2/2015 | Kim | ...................... | H04W 4/005 |
| | | | | 455/518 |

FOREIGN PATENT DOCUMENTS

| | | |
|---|---|---|
| CN | 101400186 | 4/2009 |
| TW | 201112807 | 4/2011 |
| TW | 201114282 | 4/2011 |

\* cited by examiner

SYSTEM AND METHOD OF TRIGGER SERVICE

BACKGROUND OF THE INVENTION

1. Field of the Invention

The present application relates to a system and a method of a trigger system. More particularly, the present application relates to a system and a method of a trigger system which has a plurality of mobile equipment having same ISDN number.

2. Description of the Prior Art

As development of kinds of technologies, a household electric appliance manufacturer adds various novel functions on household electric appliances. Particularly, as the development of internet technologies, the household electric appliance manufacturer further adds a network communication module on a household electric appliance, which makes the household electric appliance able to be connected to a telecom network, Internet, Intranet, or Next Generation Network (NGN), via the network communication module. Therefore, the household electric appliance is configured to be connected to websites or controlled by remote consoles, such as computers and smart phones. These kinds of remote consoles are able to control the household electric appliance in the house via the telecom network or Internet. The user is also able to get kinds of information or services from Internet by using the household electric appliance.

However, for the household electric appliance connected to Internet via telecom network issue, each household electric appliance needs a unique Mobile Subscriber Integrated Services Digital Network Number (MSISDN), like mobile equipment. This is for connection with Internet and receive communication request from an application service server (AS). When the number of mobile equipment, household electric appliance, or other non-human operated equipment that is connected to the Internet via the telecom network increases, the MSISDN number may short of supply. International Organization for Standardization has listed it as an important key issue.

To solve this issue, many institutes and researchers provided many ways, such as US published patent application nos. US 20050075106, US 20040229601, China published patent application nos. CN 101400186A, CN 1238894A, and CN 101090510A. All of the aforementioned patent applications are configured to solve shortage of mobile phone numbers. However, the aforementioned prior art only aimed at how to apply one phone number on multiple communication apparatuses and prevent a multiple registration problem on the application service server on the Internet. However, besides preventing the multiple registration problem when applying one phone number on multiple communication apparatuses, the aforementioned prior art did not cover how to activate each communication equipment connecting to the Internet, and whether the communication equipment is able to receive order and operate by the order when it is connected to the Internet. Thus, if one phone number is used on multiple household electric appliances, when each household electric appliance is connected to internet, it is unable to efficiently operate by remote order.

Still other institutes and researchers provided another ways of providing particular short message services to communication devices with different phone numbers by Short Message Service (SMS), or Multimedia Messaging Service. TW published patent no. TW201114282 disclosed a technology that the user has a particular phone number corresponding to particular group, then the user can directly send short message to the particular phone number to broadcast the short message. TW published patent no. TW1201112807 disclosed a technology that when a short message matches a predetermined content, the short message is published to the group members matching the predetermined content. The aforementioned technologies aimed at transmitting a same short message to different phone numbers, instead of operating a plurality of communication devices with the same phone number, or operating or activating the communication devices.

As aforementioned, it is necessary to solve the problem of using the same phone number in a plurality of communication devices but unable to activate or operate the communication devices, or the problem of using the conventional short message to provide particular services only for a plurality of Mobile Subscriber ISDN numbers. The issue of shortage in MSISDN numbers and the issue of unable to further operate the communication device are not solved by the conventional technologies.

SUMMARY OF THE INVENTION

Conventional technologies bring up and future development of various mobile equipment (ME), and applications shows problems that the number of Mobile Subscriber ISDN Number (MSISDN) may be in shortage and the ME maybe unable to operate after connecting to the mobile network. The present application provides that a plurality of MEs is configured to use the same ISDN number to reduce number of used ISDN numbers for solving shortage of MSISDN. Meanwhile, all MEs using the same ISDN are able to receive the trigger SMS from the Application Service server, AS, and complete the requested services.

One objective of the present application is to provide a system of trigger service. The system is applied between an end equipment group and an application service terminal. The end equipment group comprises a plurality of end equipment using the same ISDN number, and each of end equipment of the end equipment group is configured to sequentially connect to mobile network in a predetermined connection sequence. After connected to mobile network, each of equipment is configured to keep connection with mobile network in a waiting period and suspended to access mobile network after the waiting time period. The application service terminal is configured to transmit a trigger message to the end equipment group according to a message arrangement, and the trigger message is repeatedly transmitted in a transmission period of the message arrangement to make sure that each of equipment connected to mobile network receives the trigger message in valid period. While each of end equipment receives the trigger message transmitted by the application server, it executes the requested order of the trigger message. And each of end equipment of end equipment group reboots and executes above procedure until each of mobile end equipment finished the execution.

Another objective of the present application is to provide a method of a trigger service among a plurality of end equipment. The method is applied on end equipment which is capable of receiving trigger SMSs, such as short message or multimedia messaging services, and establishing data communication. A plurality of end equipment are able to use the same ISDN, such as Mobile Subscriber ISDN number (MSISDN), are integrated as an end equipment group. A predetermined connection sequence is applied so that each of end equipment of the end equipment group is able to access mobile network sequentially. Each of end equipment is configured to keep connection with the mobile network during a waiting period when the end equipment is connected to the mobile network, and after the waiting period, it is paused to access the mobile network.

When each of end equipment accesses the mobile network, if the end equipment receives a trigger SMS from the application service terminal, it is able to execute the request order in the trigger SMS.

All end equipment of the same end equipment group sequentially boot to execute the aforementioned process until all end equipment of the same end equipment group complete execution. Thus, each of end equipment of each end equipment group is able to complete following service as long as it receives the trigger SMS form the application service server.

Another objective of the present application is to provide a method of trigger service by an application service terminal. An application service terminal is configured to provide a trigger SMS to a plurality of end equipment group according to a message sequence. The end equipment group comprises a plurality of end equipment

DETAILED DESCRIPTION OF THE PREFERRED EMBODIMENT

To express the technical features, contents, advantages and effects of the present application to assist examiner in understanding the present application, the specification and drawings are expressed in embodiments as followed. The drawings are provided to exemplarily show the present application and may not show the true ratio and arrangement of the present application. The drawings are not intended to limit the scope of the present application with the ratio and arrangement thereof.

Figure 1:
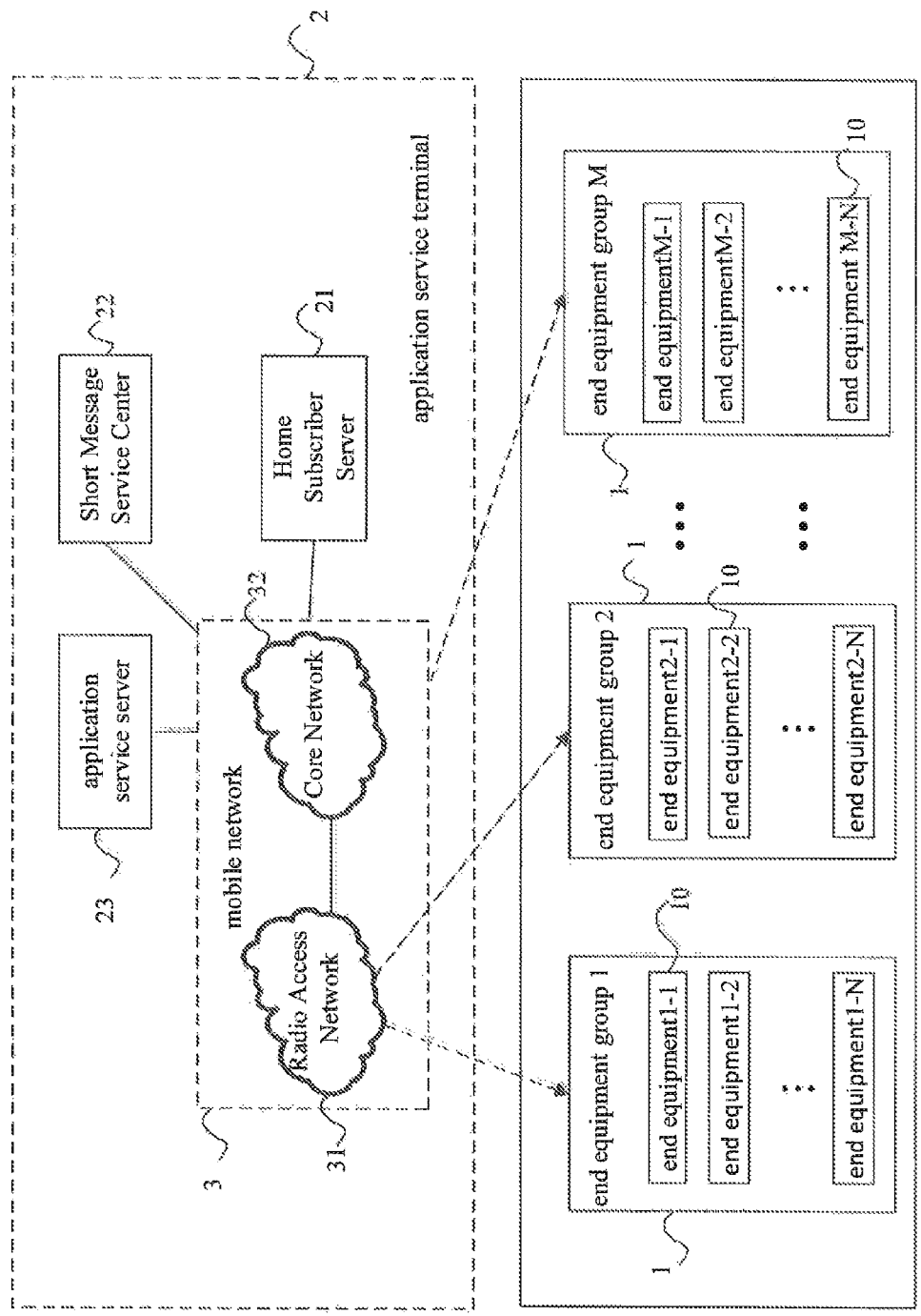
FIG. 1 shows a system of trigger service of the first embodiment of the present application.

FIG. 1 shows a system of trigger service of the present application. The system is applied among a plurality of end equipment group 1 and an application service terminal 2. The end equipment group 1 has a plurality of end equipment 10. The plurality of end equipment 10 within the same end equipment group 1 have the same identify number (ISDN number). In FIG. 1, there are M end equipment groups 1, and each end equipment group 1 uses a different ISDN respectively. Each end equipment group 1 has N end equipment, and each end equipment 10 of the same end equipment group 1 has the same ISDN. Each end equipment 10 of each end equipment group 1 follows a predetermined connection sequence to access a mobile network 3, and each end equipment 10, after connected to the mobile network 3, is configured to keep connection with the mobile network 3 in a waiting period and suspended to access the mobile network 3 after the waiting time period. An application service terminal 2 is configured to transmit a trigger message to each end equipment group 1 by a message sequence. The trigger message is repeatedly transmitted every a certain period during a valid transmission duration of the message sequence. Thus, during the valid transmission duration each end equipment 10 of the end equipment group 1 connected to the mobile network is able to execute the requested order carried by the trigger message when the trigger message from the application service terminal 2 is received by the end equipment 10.

Figure 2:
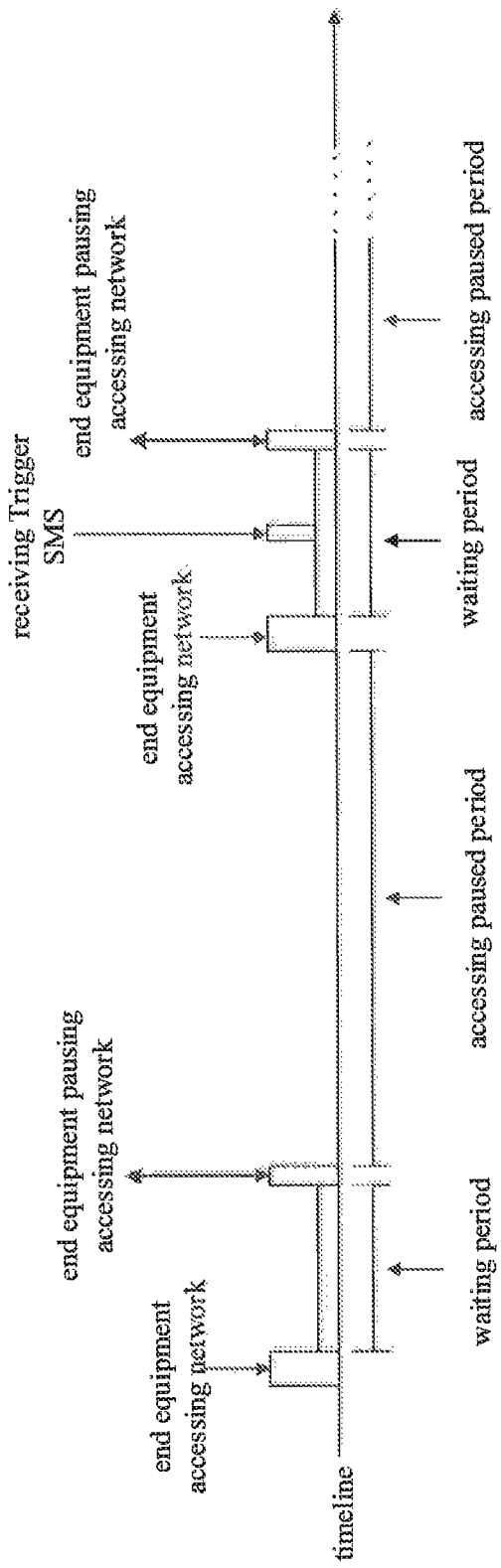
FIG. 2 shows sequence diagram of end equipment of the present application.

FIG. 2 shows a sequence diagram of the end equipment groups of the system of the trigger service according to the first embodiment of the present application. It shows how all end equipment 10 of the same end equipment group 1 with the same ISDN operate, during the valid duration T of the connection sequence. One of the end equipment 10 of the end equipment group 2 is connected to the mobile network. In addition, the present end equipment connected to the mobile network is configured to continue a waiting period w for receiving trigger message. After the waiting period w, the present end equipment 10 connected to the mobile network is configured to pause accessing the mobile network. All end equipment 10 is configured to access and pause accessing the mobile network at different time within the valid duration T by the aforementioned cycling within the valid duration T. Thus, the end equipment with the same ISDN is prevented from connecting to the mobile network at the same time.

Figure 3:
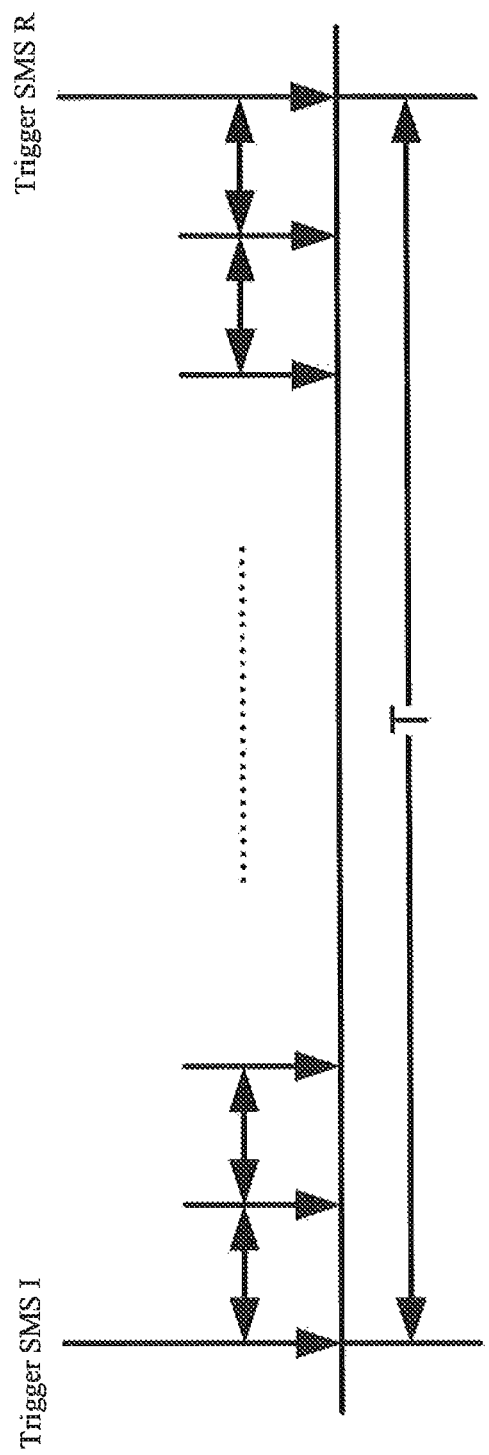
FIG. 3 shows a sequence diagram of message sequence in the application service terminal of the present application.

FIG. 3 shows a sequence diagram of the message sequence in the application service terminal of the system of the trigger service according to the first embodiment of the present application. It shows that, during a valid duration t of the message sequence, the application service terminal 2 is configured to repeatedly transmit the trigger message R times every Δ time period to increase the probability that all end equipment 10 of the end equipment group 2 are able to receive the trigger message. The R is a positive integer and Δ represents a predetermined time period.

As aforementioned, when the application service terminal 2 transmits the trigger SMS during the valid duration t of the message sequence, if any end equipment 10 accesses the mobile network during the valid duration T of the connection sequence, it is possible to receive the trigger message and execute the request order in the trigger message.

For example, each end equipment 10 of one end equipment group 1 is a household electric appliance with a different function, and has the same identify number (phone number as the ISDN) of the present application. Each household electric appliance is configured to use the same phone number by a telecom communication protocol and receive short message via a telecom network. The telecom network is the mobile network of the present application, and the short message is the trigger message of the present application. And the household electric appliance is configured to execute boot operation when it receives a short message of "Turn On". Thus, when the application service terminal 2 transmits, a short message of "Turn On" during a valid duration t of the message sequence, and any household electric appliance is connected to the telecom network during a valid duration T of the connection sequence, it is able to receive the short message of "Turn On" and to execute boot operation.

Figure 4:
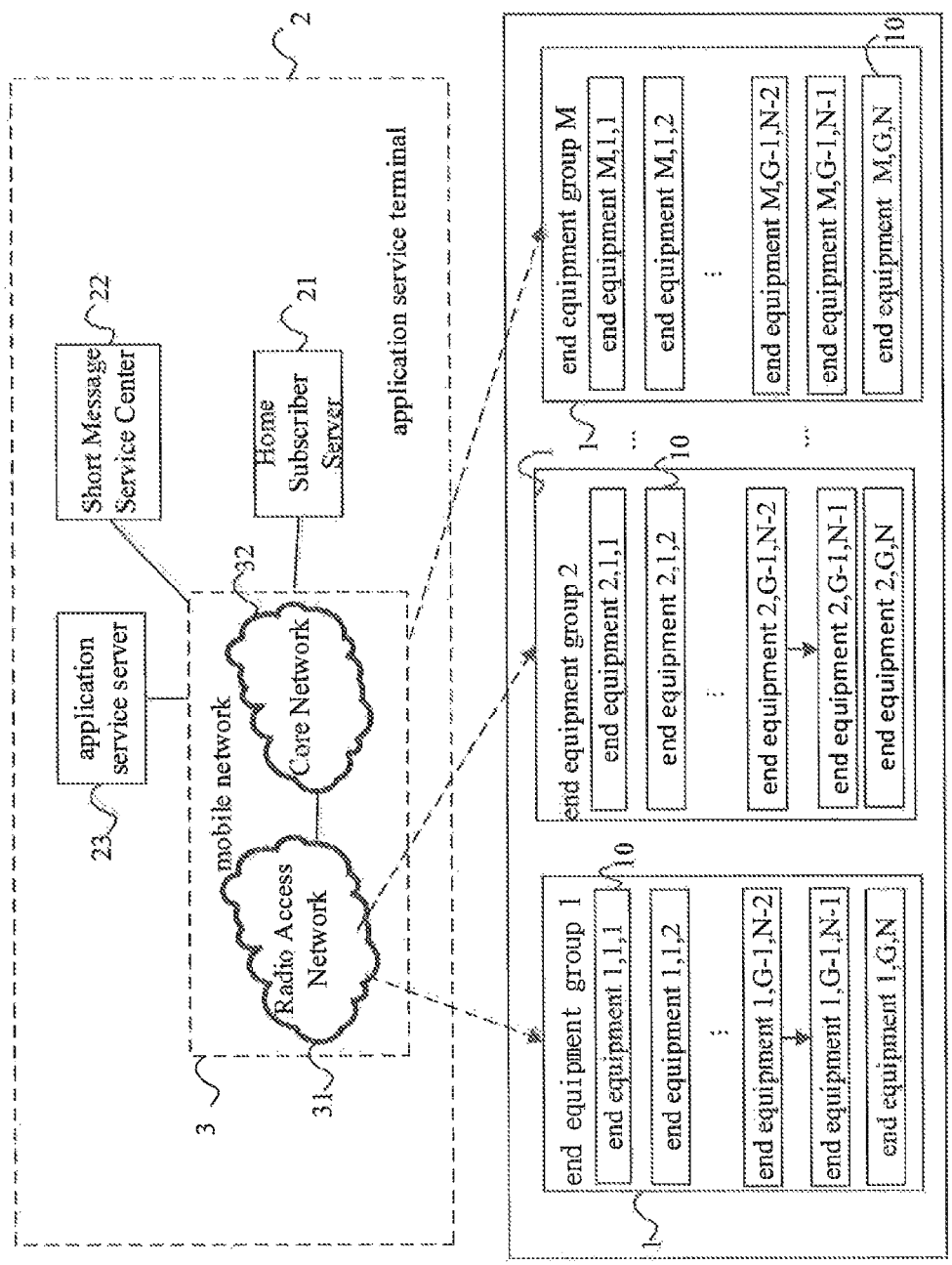
FIG. 4 shows system diagram of second embodiment of the present application.

FIG. 4 shows a system diagram of a second embodiment of the present application, which is similar to the first embodiment. The difference between the first embodiment and the second embodiment is that the N end equipment of the second embodiment are divided into G subgroups. Under the system of the second embodiment, the trigger message further comprises a matching subgroup parameter corresponding to one of the subgroups. During the valid transmission duration of the application service terminal 2, each end equipment 10 of one subgroup of each end equipment group 1 is configured to access the mobile network, and when the trigger message from the application service terminal 2 is received, the subgroup parameters of the trigger message is examined to determine whether the subgroup parameters match the subgroup for executing the requested order of the trigger message. In other words, there are M end equipment groups 1, and each end equipment group 1 uses a different ISDN respectively, and each end equipment group 1 has G subgroups, and each subgroup has N end equipment. The end equipment 10 within the same end equipment group 1 but in different subgroups still use the same ISDN.

Moreover, the application service terminal 2, during the valid duration t of the message sequence, is configured to repeatedly transmit the trigger message R times every Δ time period, and the application service terminal 2 is configured to add or delete partial order in the trigger message corresponding to each subgroup. The trigger message, taking short message as an example, is shown as below:

| ISDN | subgroup 1, order | subgroup 2, order | ... | subgroup G-1, order | subgroup G, order |
|------|-------------------|-------------------|-----|---------------------|-------------------|

For example, a company is set up with a plurality of end equipment group 1 on different floors, and the end equipment groups 1 on different floors are assigned with different phone numbers as the ISDN of the present application. And each end equipment group 1 is able to use the particular phone number based on telecom communication protocol to receive short message via the telecom network. Moreover, the telecom network is the mobile network of the present application. The end equipment 10 of the end equipment groups 1 on different floors are smart lamps in offices. All smart lamps are divided into different subgroups based on departments or areas of distribution. All smart lamps are predefined corresponding to different floors, departments, or areas (i.e. the subgroups) as "9F-personnel department I-lamp-Turn ON", "9F-personnel department II-lamp-Turn ON", "9F-personnel department III-lamp-Turn ON", "10F-business department I-lamp-Turn ON", "10F-business department II-lamp-Turn ON", "10F-business department III-lamp-Turn ON", and etc. The aforementioned short message represents a turn-on operation corresponding to smart lamps in different departments/areas of different floors.

Thus, when the short message transmitted by the application service terminal 2 during the valid duration t of the message sequence comprises "9F-personnel department I-lamp-Turn ON", and the smart lamp in personnel department I on 9F just accesses the telecom network during the valid duration T of the connection sequence, the smart lamp would receive the short message of "9F-personnel department I-lamp-Turn ON", and is able to execute the turn-on operation. But when the short message of "9F-personnel department I-lamp-Turn ON" is transmitted during the valid duration t of the message sequence of the application service terminal 2 but the smart lamp in personnel department II on 9F accesses the mobile network during the valid duration T of the connection sequence, the smart lamp would receive the short message of "9F-personnel department I-lamp-Turn ON", and is unable to execute the turn-on operation. Besides, when the short message of "9F-personnel department I-lamp-Turn ON" is transmitted during the valid duration t of the message sequence of the application service terminal 2, the smart lamps on 10F would not receive the short message since the smart lamps on 10F uses the phone number different from the phone number of the smart lamps on 9F.

Moreover, the aforementioned short message can also be "9F-personnel department I-lamp-Turn ON & 9F-personnel department Ill-lamp-Turn ON". It means that, under format of short message transmission, one short message could comprise messages for different subgroups and only the corresponding subgroup would execute the order. Further, the aforementioned short message of "9F-personnel department I-lamp-Turn ON & 9F-personnel department III-lamp-Turn ON" would possibly be received by the smart lamps of "9F-personnel department". However, since the content is irrelevant to the smart lamps of "9F-personnel department", the smart lamps of "9F-personnel department" would ignore the content.

Figure 5:
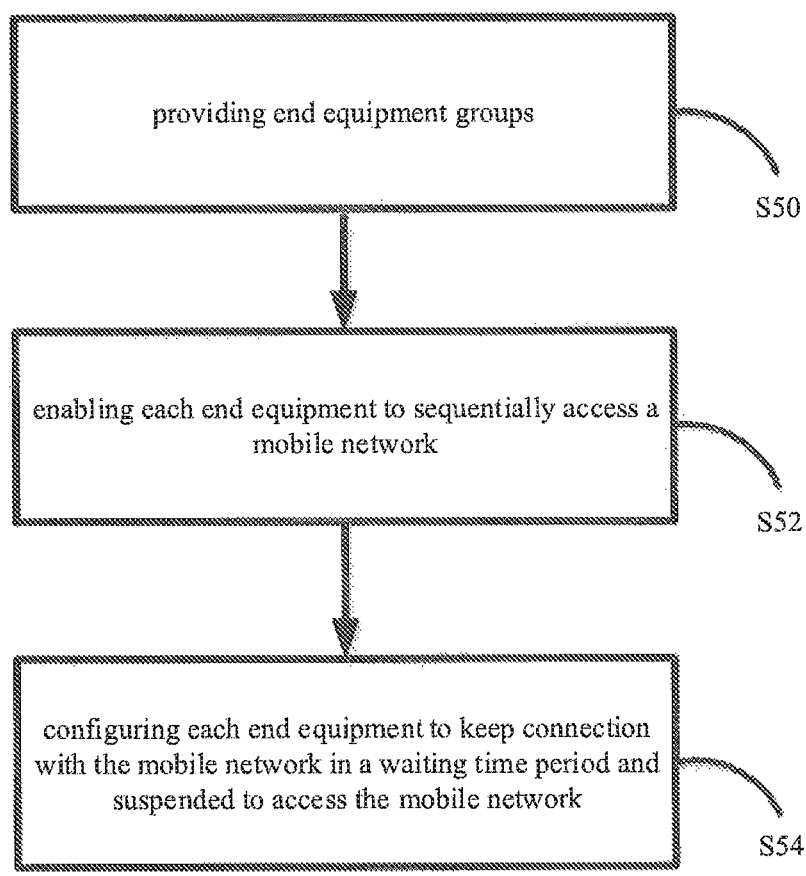
FIG. 5 shows a flow diagram of a method of trigger service of a plurality of end equipment of the present application.

FIG. 5 shows a flow diagram of a method of the trigger service of a plurality of end equipment of the present application. The method is applied on an end equipment being able to receive trigger messages and establish data communication. The trigger service of the end equipment comprises steps of:

S50: providing a plurality of end equipment group, wherein each end equipment group comprises a plurality of end equipment, and the end equipment within the same end equipment group have the same ISDN number, the end equipment among different end equipment groups have different ISDN number respectively.

S52: each end equipment of each end equipment group is enabled to follow a predetermined connection sequence to access a mobile network.

S54: each end equipment, after connected to the mobile network, is configured to keep connection with the mobile network in a waiting time period and suspended to access the mobile network after the waiting time period.

Thus, all end equipment of each end equipment group are able to execute the aforementioned connection sequence, and all end equipment of each end equipment group are able to access and pause accessing the mobile network. During the period that each of end equipment accesses the mobile network, if the end equipment receives the trigger message from the application service terminal, it would execute the requested order carried by the trigger message.

Figure 6:
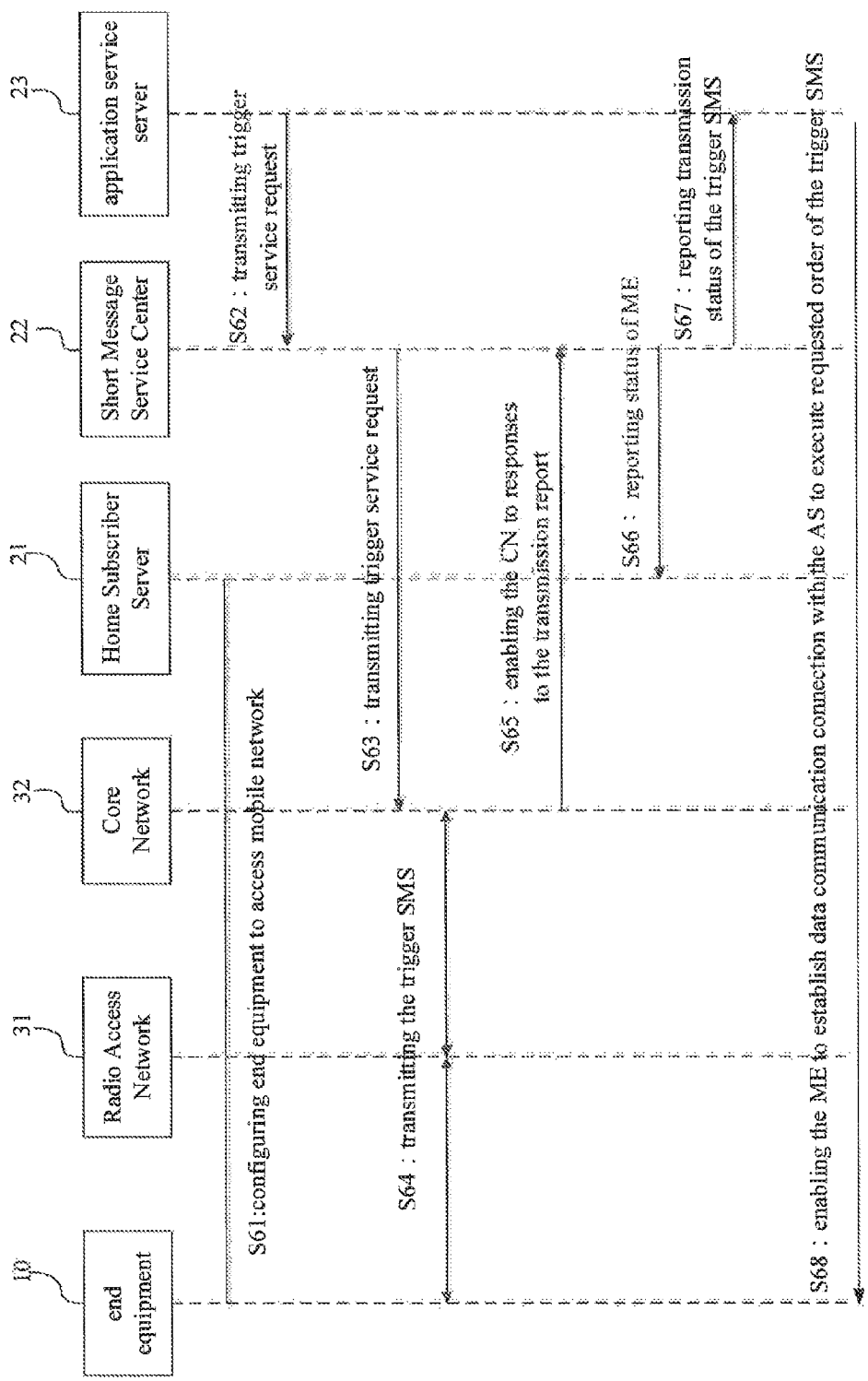
FIG. 6 shows a flow diagram of trigger service of MEs of the first embodiment of the present application.

In the first embodiment of the present application, as shown in FIG. 1, the end equipment 10 can be a Mobile Equipment (ME), such as a mobile phone. The ISDN can be a Mobile Subscriber ISDN number (MSISDN), the mobile network 3 can be a Radio Access Network (RAN), and a Core Network (CN) 32, and the application service terminal comprises a Home Subscriber Server (HSS) 21, a Short Message Service Center (SM-SC) 22 and an Application service Server (AS) 23, and the trigger message is a Trigger Short Message Service (Trigger SMS), wherein in the present application, it is a short message but the trigger message can also be a multimedia messaging service (MMS), for example the short message can be converted into a QR code as shown in FIG. 6. The service of the ME comprises steps of:

S61: the ME is configured to access the mobile network, complete registration process, and wait for receiving a trigger SMS.

S62: when the AS transmits a trigger service request to the Short message service center.

S63: the Short message service center is configured to find out the ME and transmit the trigger SMS via the CN according to the MSISDN contained in the trigger request.

S64: the ME is enabling to receive the trigger SMS via the RAN;

S65: the CN is enabling to response to the transmission report and confirm whether the ME received the SMS.

S66: the Short message service center is enabling to report status of ME to the HSS.

S67: the Short message service center is enabling to report transmission status of the trigger SMS to the AS.

S68: the ME is enabled to establish data communication connection with the AS to execute requested order of the trigger SMS.

Figure 7:
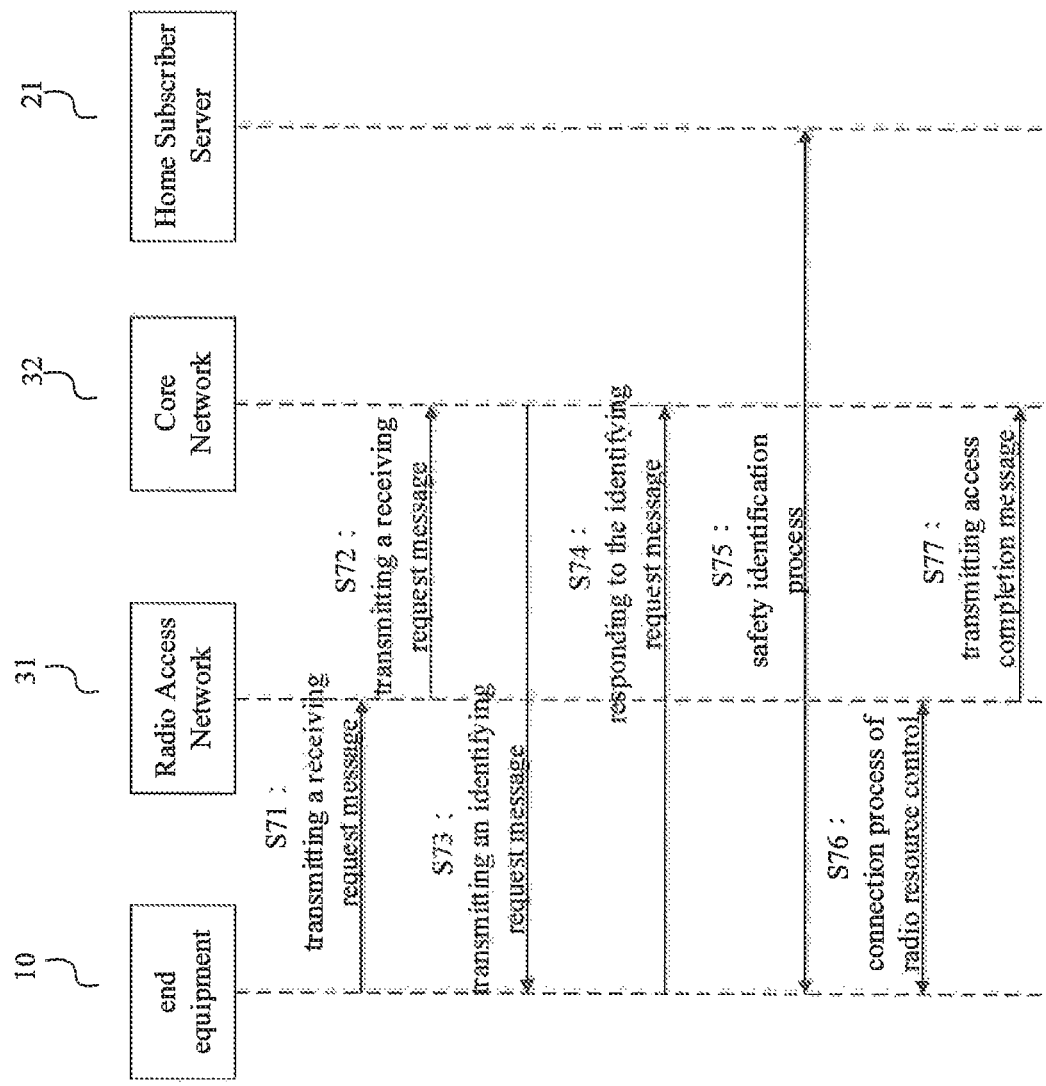
FIG. 7 shows flow chart of how the ME of the first embodiment accesses the mobile network.

FIG. 7 shows a flow chart of how the ME accesses the mobile network in the first embodiment, which comprises steps of:

S71: the ME is enabled to transmit a receiving request message to the RAN.

S72: the RAN is enabled to transmit the receiving request message from ME to the CN.

S73: the CN is enabled to transmit an identifying request message to the ME.

S74: the ME is enabled to response to the CN with an identifying response message in response to the identifying request message.

S75: the HSS and the ME are enabled to process a safety identification process.

S76: the ME and the RAN are enabled execute connection process of radio resource control.

S77: the RAN is enabled to transmit access completion message to the CN.

Figure 8:
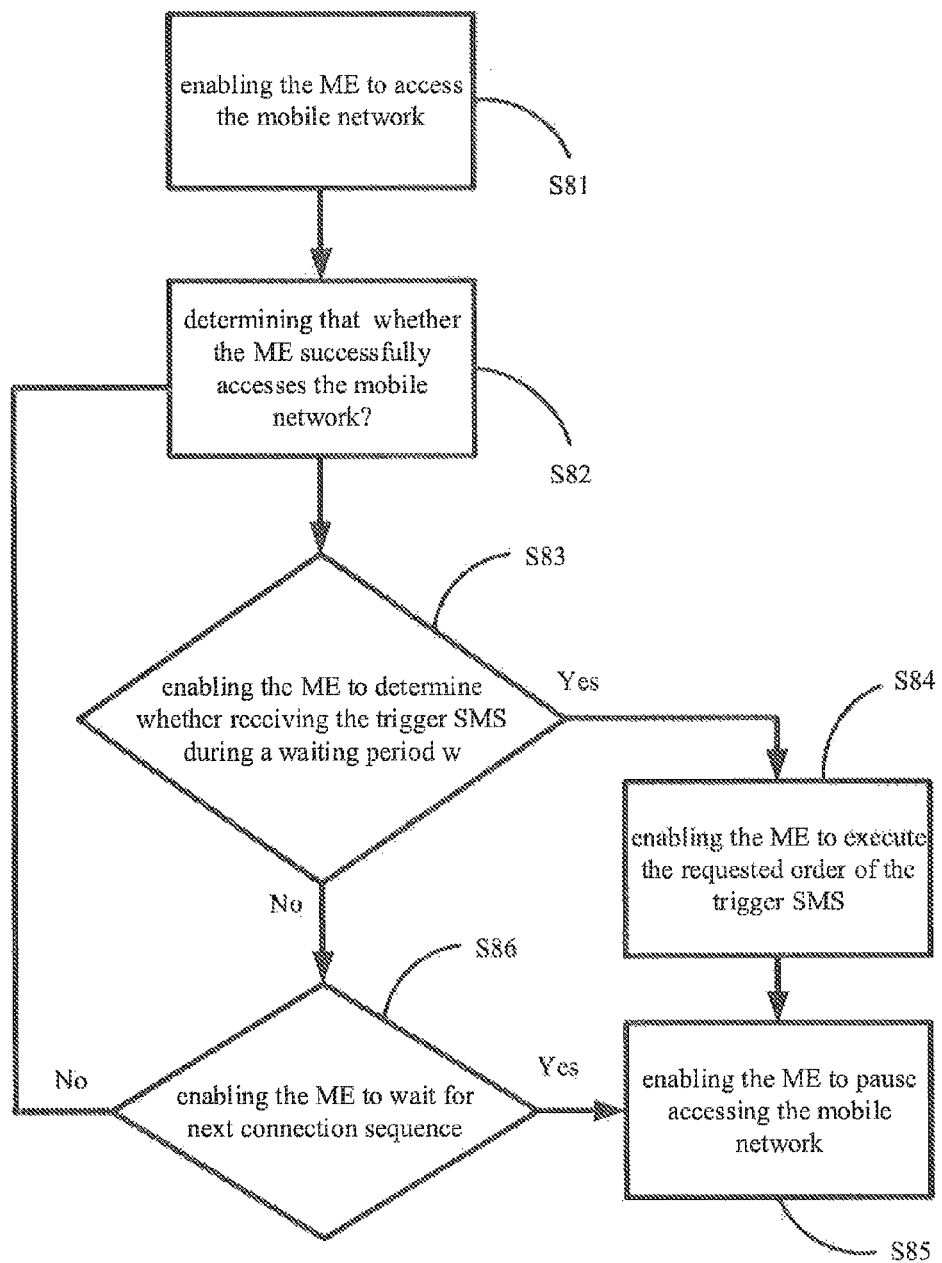
FIG. 8 shows flow chart of how each of end equipment of the first embodiment receives the trigger message during accessing the mobile network.

FIG. 8 shows a flow chart of how each end equipment receives the trigger message during accessing the mobile network in the first embodiment, which comprises steps of:

S81: the ME is enabled to access the mobile network.

S82: determining whether the ME to successfully accesses the mobile network? If yes, it goes to step S83, otherwise it goes to step S86.

S83: the ME is enabled to determine whether receiving the trigger SMS during a waiting period w. If yes, it goes to step 84, otherwise it goes to step S85.

S84: the ME is enabled to execute the requested order of the trigger SMS.

S85: the ME is enabled to pause accessing the mobile network.

S86: the ME is enabled to wait for next connection sequence.

Figure 9:
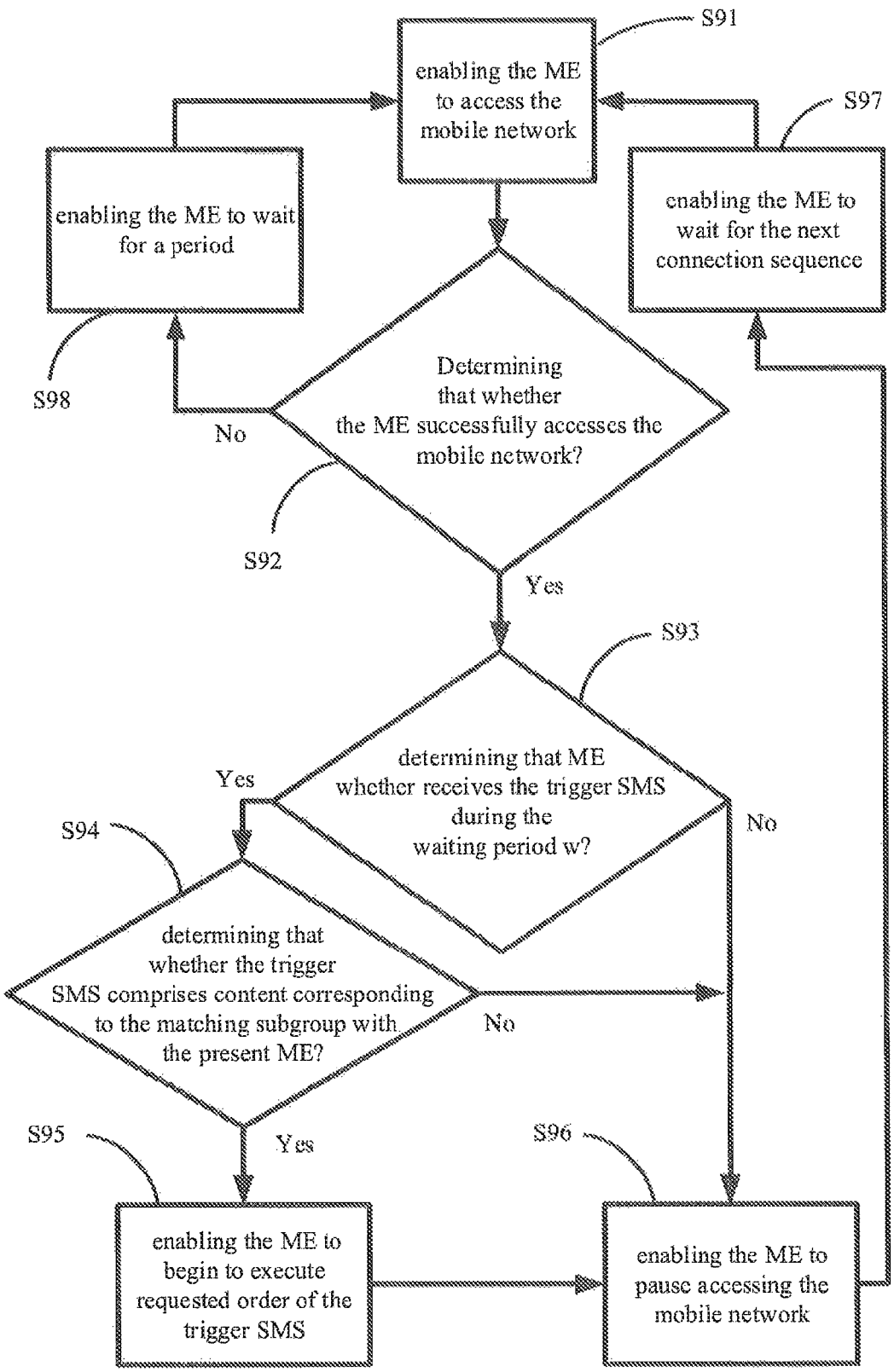
FIG. 9 shows flow chart of how each of end equipment of the second embodiment receives the trigger SMS during accessing the mobile network.

For the second embodiment of the present application, it is similar to the first embodiment. The difference between the first embodiment and the second embodiment is that the N end equipment of the second embodiment is divided into G subgroups. Under the system of the second embodiment, the trigger message further comprises matching subgroup parameter corresponding to one of the subgroup. FIG. 9 shows how each end equipment receives the trigger SMS during accessing the mobile network, which comprises steps of.

S91: the ME is enabled to access the mobile network.

S92: determining that whether the ME successfully accesses the mobile network? If yes, it goes to step S93, otherwise it goes to step S98.

S93: the ME determines whether receiving the trigger SMS during the waiting period w. If yes, it goes to step S94, otherwise it goes to step S96.

S94: the ME is enabled to determine whether the trigger SMS comprises content corresponding to the matching subgroup with the present ME. If yes, it goes to step S95, otherwise it goes to step S96.

S95: the ME is enabled to begin to execute requested order of the trigger SMS.

S96: the ME is enabled to pause to access the mobile network.

S97: the ME is enabled to wait for the next connection sequence.

S98: the ME is enabled to wait for a period then process step S91 again.

Figure 10:
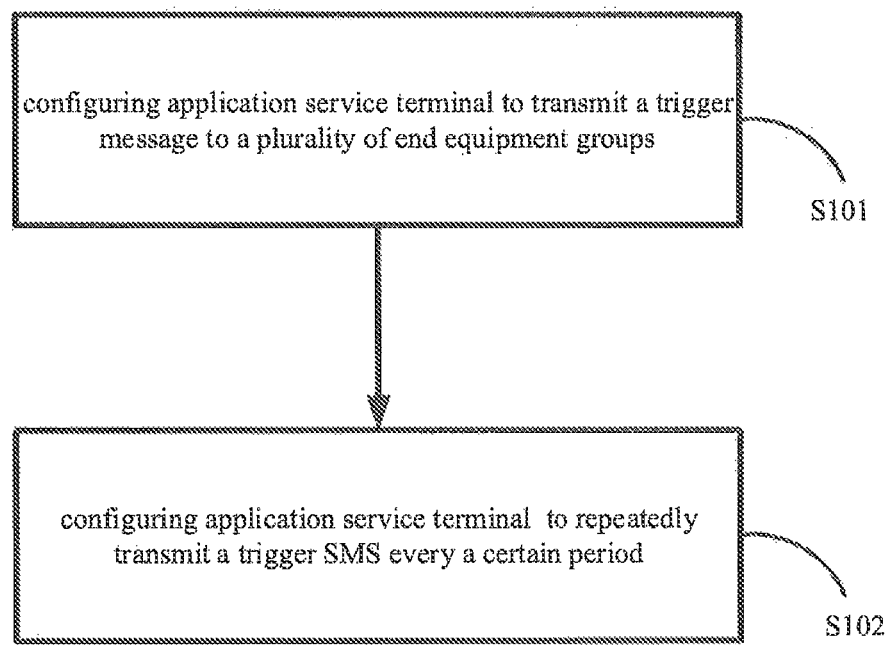
FIG. 10 shows a method of trigger service provided by an application service terminal of the first embodiment of the present application.

FIG. 10 shows a method of the trigger service provided by an application service terminal of the present application, which comprises steps of:

S101: an application service terminal is configured to transmit a trigger message to a plurality of end equipment groups having end equipment using the same ISDN number.

S102: the Application service terminal is configured to repeatedly transmit a trigger SMS every a certain period during a valid transmission duration of the message sequence to ensure each end equipment of the end equipment group being able to receive the trigger message.

In the first embodiment of the present application. It shows that, during a valid duration T of the message sequence, the application service terminal is configured to repeatedly transmit the trigger message R times every $\Delta$ time period to increase the probability of that all MEs are able to receive the trigger message.

Figure 11:
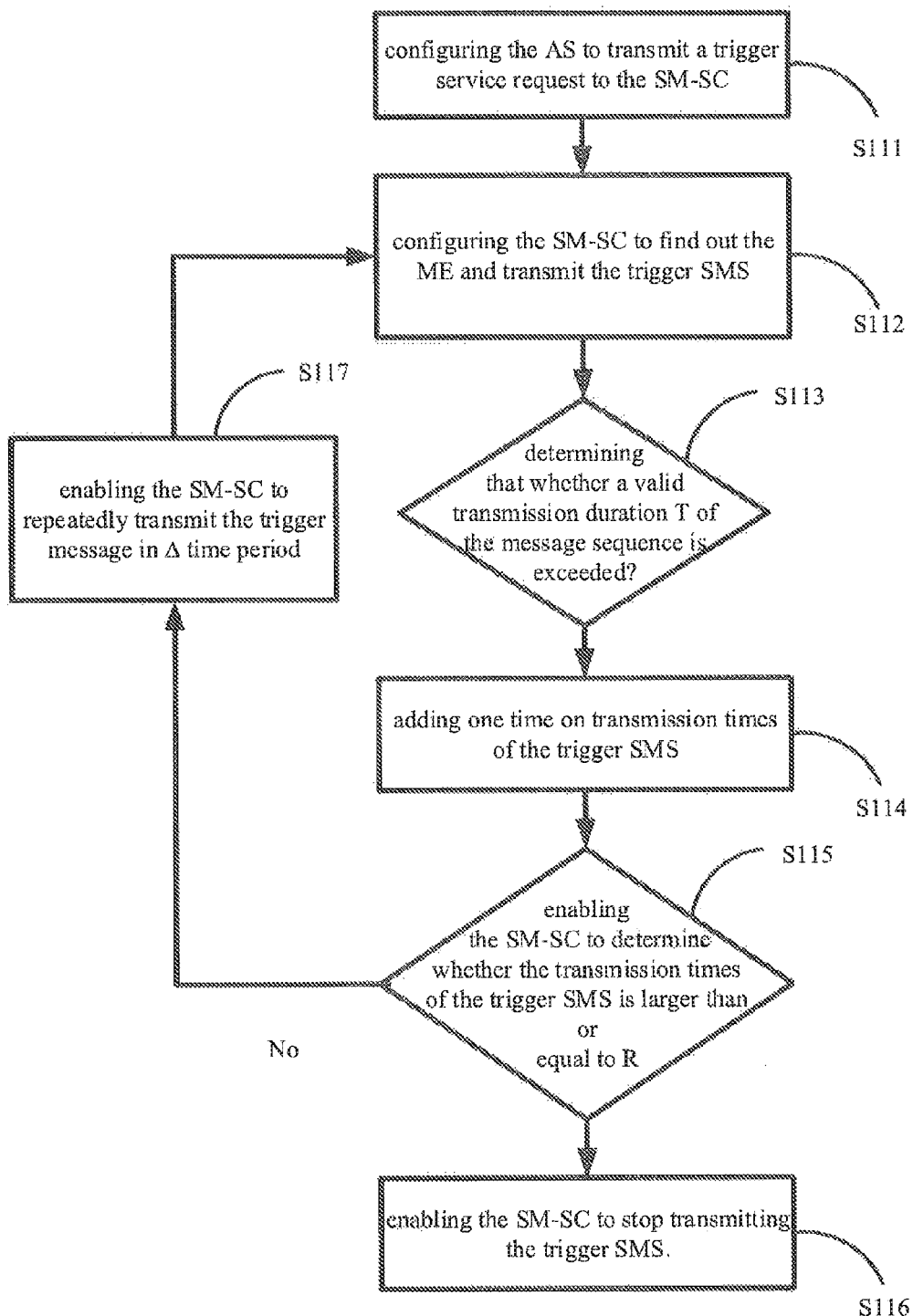
FIG. 11 shows flow chart of how the application service terminal of the first embodiment transmits the trigger SMS by an AS and an SM-SC.

FIG. 11 shows how the application service terminal transmits the trigger SMS by an AS and an SM-SC, which comprises steps of:

S111: the AS is configured to transmit a trigger service request to the SM-SC.

S112: the SM-SC is configured to find out the ME according to a MSISDN in the trigger request through the CN and transmit the trigger SMS.

S113: the SM-SC is configured to determine whether a valid transmission duration T of the message sequence is exceeded. If yes, it goes to step S116, otherwise it goes to step S114.

S114: the SM-SC is configured to add one on transmission times of the trigger SMS.

S115: the SM-SC is enabled to determine whether the transmission times of the trigger SMS is larger than or equal to R. If yes, it goes to step S116, otherwise it goes to step S117.

S116: the SM-SC is enabled to stop transmitting the trigger SMS.

S117: the SM-SC is enabled to repeatedly transmit the trigger message in $\Delta$ time period.

Figure 12:
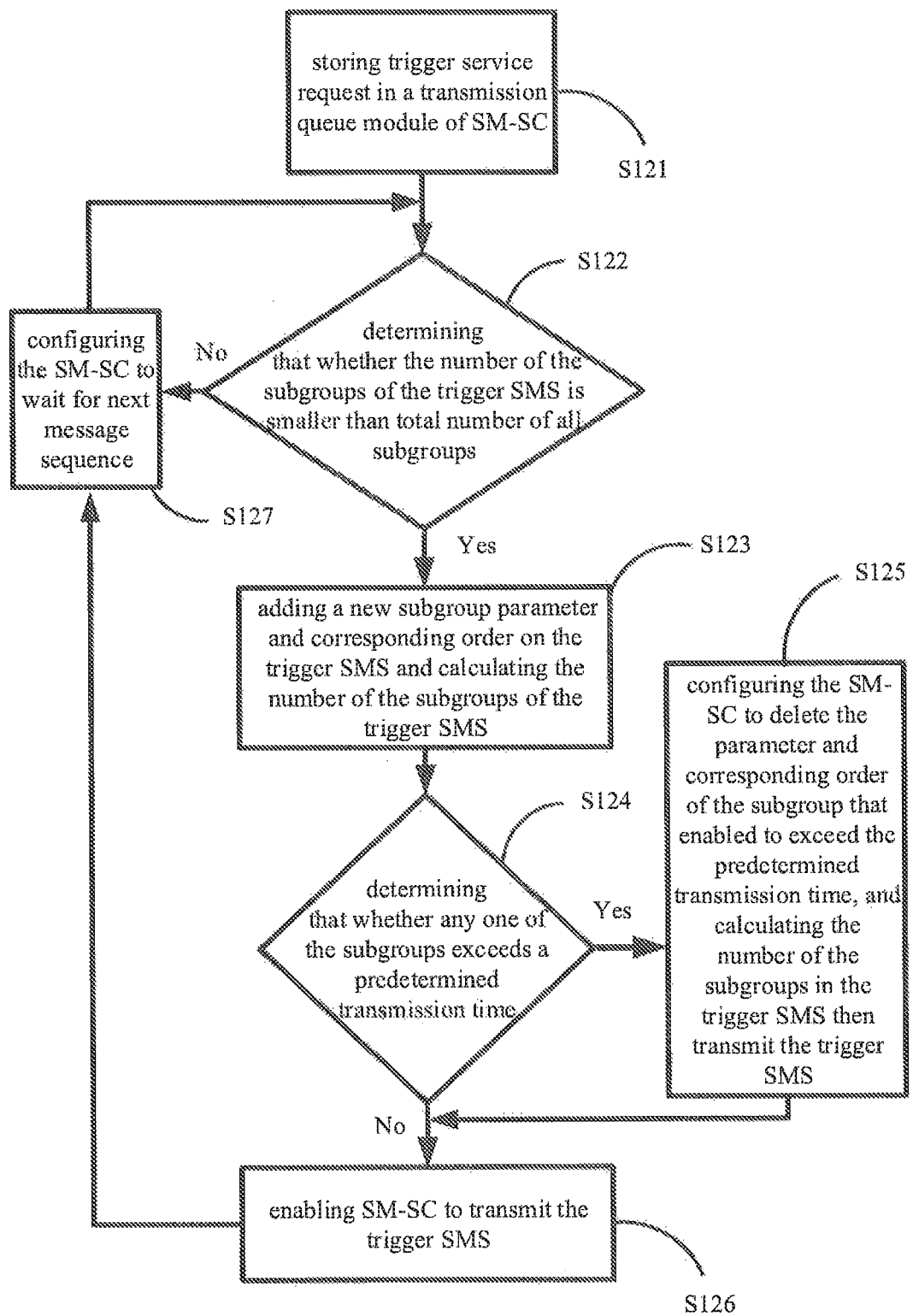
FIG. 12 shows flow chart of how the application service terminal of the second embodiment transmits the trigger SMS by an AS and an SM-SC.

For the second embodiment of the present application, it is similar to the first embodiment. The difference between the first embodiment and the second embodiment is that the N end equipment of the second embodiment are divided into G subgroups. Under the system of the second embodiment, the trigger message further comprises matching subgroup parameter corresponding to one of the subgroup. FIG. 12 shows how the application service terminal of the second embodiment transmits the trigger SMS by an AS and an SM-SC, which comprises steps of:

S121: the AS is configured to transmit a trigger service request to the Short message service center, and temporarily store a trigger service request in a transmission queue module.

S122: the Short message service center is configured to determine whether the number of the subgroups of the trigger SMS is smaller than total number of all subgroups. If yes, it goes to step S123, otherwise it goes to step S127.

S123: a new subgroup parameter and corresponding order are added on the trigger SMS and the number of the subgroups of the trigger SMS is calculated.

S124: the SM-SC is enabled to determine whether any one of the subgroups exceeds a predetermined transmission time. If yes, it goes to step S125, otherwise it goes to step S126.

S125: the SM-SC is configured to delete the parameter and corresponding order of the subgroup that enabled to exceed the predetermined transmission time, and calculate the number of the subgroups in the trigger SMS then transmit the trigger SMS, then step S126 is proceeded.

S126: the SM-SC is enabled to transmit the trigger SMS.

S127: the SM-SC waits for the next message sequence.

As aforementioned, the present application uses sequence technologies to ensure the end equipment access the mobile network by a predetermined sequence, and the short messages are applied in the present application to trigger the end equipment and establish communication with the end equipment. The present application has advantages as follows:

1. applying the present application does not change the conventional mobile network short message protocol and network structure, and the SM-SC only needs to set up message sequence.

2. the present application is configured to use end equipment group which has a plurality of end equipment with the same ISDN number, which is efficient to solve shortage of ISDN numbers.

3. the end equipment of the present application is not necessary to fulltime access the mobile network, which is good at power saving.

The above disclosure is related to the preferred embodiments of the present application and is not intended to limit the scope of the present application. People skilled in this field may proceed with a variety of modifications and replacements based on the disclosures and suggestions of the application as described without departing from the characteristics thereof. Nevertheless, although such modifications and replacements are not fully disclosed in the above descriptions, they have substantially been covered in the following claims as appended.

Many changes and modifies in the above described embodiment of the application can, of course, be carried out without departing from the scope thereof. Accordingly, to promote the progress in science and the useful arts, the application is disclosed and is intended to be limited only by the scope of the appended claims.

What is claimed is:

1. A method of a trigger service for a plurality of end equipment, the method being applied on the plurality of end equipment capable of receiving a trigger message transmitted from an application service terminal and establishing data communication, the method comprising:

providing a plurality of end equipment group, wherein each end equipment group comprises a plurality of end equipment, and each end equipment group has an identify number, the identify number of each equipment group is unique;

enabling each of the plurality of end equipment of each end equipment group to follow a predetermined connection sequence to access a mobile network; and configuring each of the plurality of end equipment to connect to the mobile network and keep connection with the mobile network in a waiting period and to suspend to access the mobile network after the waiting time period; wherein each of the plurality of end equipment is a mobile equipment (ME), the identify number is a mobile subscriber ISDN number (MSISDN), the mobile network includes a radio access network (RAN) and a Core Network (CN), the application service terminal comprises a Home Subscriber Server (HSS), a Short message service center and an Application service Server (AS), and the trigger message is a trigger short message service (SMS), the method further comprising:

configuring the ME to access the mobile network, complete registration process, and wait for receiving the trigger SMS;

when the AS transmits a trigger service request to the Short message service center;

configuring the Short message service center to find out the ME and transmit the trigger SMS via the CN according to the MSISDN contained in the trigger service request;

enabling the ME to receive the trigger SMS via the RAN;

enabling the CN to response to a transmission report and confirm whether the ME received the trigger SMS;

enabling the Short message service center to report status of the ME to the HSS;

enabling the Short message service center to report transmission status of the trigger SMS to the AS; and enabling the ME to establish data communication connection with the AS to execute requested order of the trigger SMS; and wherein configuring the ME to access the mobile network comprises:

enabling the ME to transmit a receiving request message to the RAN;

enabling the RAN to transmit the receiving request message from the ME to the CN;

enabling the CN to transmit an identifying request message to the ME;

enabling the ME to respond to the CN with an identifying response message in response to the identifying request message;

enabling the HSS and the ME to process a safety identification process;

enabling the ME and the RAN to execute a connection process of radio resource control; and enabling the RAN to transmit an access completion message to the CN.

2. The method of trigger service for a plurality of end equipment as claimed in claim 1, wherein when each of the plurality of end equipment is connected to the mobile network, and when the trigger message is received by the each of the plurality of end equipment, the each of the plurality of end equipment is configured to execute the requested order carried by the trigger message;
wherein all of the plurality of end equipment of the same end equipment group are configured to execute the connection sequence until all of the plurality of end equipment of the same end equipment group complete the execution.

3. The method of a trigger service for a plurality of end equipment as claimed in claim 1, wherein enabling the ME to receive the trigger SMS comprises:
enabling the ME to access the mobile network;
determining whether the ME to successfully accesses the mobile network;
enabling the ME to determine whether the trigger SMS is received during the waiting period when the ME successfully accesses the mobile network; and
enabling the ME to establish the data communication connection with the AS and executes the requested order of the trigger SMS when the ME receives the trigger SMS during the waiting period.

4. The method of a trigger service for a plurality of end equipment as claimed in claim 3, wherein when the ME is unable to receive the trigger SMS during the waiting period, the ME is configured to pause accessing the mobile network;
wherein when the ME is unable to access the mobile network, the ME is configured to wait for next connection arrangement.

5. The method of a trigger service for a plurality of end equipment as claimed in claim 1, wherein each end equipment group includes a plurality of subgroups, and enabling the ME to receive the trigger SMS when the ME accesses the mobile network comprises:
enabling the ME to access the mobile network;
determining whether the ME successfully accesses the mobile network;
enabling the ME to determine whether the trigger SMS is received during the waiting period when the ME successfully accesses the mobile network;
enabling the ME to determine whether the trigger SMS comprises a content corresponding to the matching subgroup with the ME when the ME receives the trigger SMS during the waiting period; and
enabling the ME to execute the request order of the trigger SMS when the ME determines that the trigger SMS comprises the content corresponding to the matching subgroup with the ME.

6. The method of a trigger service for a plurality of end equipment as claimed in claim 5, wherein when the ME is not successfully connected to the mobile network, the ME is configured to wait for a period and then access the mobile network;
wherein when the ME is unable to receive the trigger SMS during the waiting period, the ME is configured to pause accessing the mobile network;
wherein when the trigger SMS received by the ME does not comprise the content corresponding to the matching subgroup with the ME, the ME is configured to pause accessing the mobile network.

7. A method of providing a trigger service by an application service terminal, wherein the application service terminal is configured to provide the trigger service to a plurality of end equipment groups, the method comprising:
configuring the application service terminal to transmit a trigger message to one of the plurality of end equipment groups by a message sequence, and each of the plurality of end equipment groups has a plurality of end equipment, and each of the plurality of end equipment within a same end equipment group have an identify number, the identify number of each end equipment group is unique;
configuring the application service terminal to repeatedly transmit a trigger message every certain period during a valid transmission duration of the message sequence;
wherein the trigger message comprises the identify number and an order of an end equipment group which are used to transmit the trigger message, and is transmitted to another end equipment group by the message sequence, when each of the plurality of end equipment of each end equipment group accesses a mobile network, each of the plurality of end equipment is able to receive the trigger message and execute requested order according to a content of the trigger message; wherein
each of the plurality of end equipment is a mobile equipment (ME),
the identify number is a mobile subscriber ISDN number (MSISDN),
the mobile network includes a radio access network (RAN) and a Core Network (CN),
the application service terminal comprises a Home Subscriber Server (HSS), a Short message service center and an Application service Server (AS), and
the trigger message is a trigger short message service (SMS),
each end equipment group includes a plurality of subgroups, and
the application service terminal uses the AS and the Short message service center to transmit the trigger SMS by the steps of:
configuring the AS to transmit a trigger service request to the Short message service center;
configuring the Short message service center to find out the ME according to a MSISDN in the trigger service request through the CN and transmit the trigger SMS;
configuring the Short message service center to determine whether a valid transmission duration of the message sequence is exceeded;
enabling the Short message service center to increase a number of transmission times of the trigger SMS when the short message service center determines that valid transmission duration of the message sequence is not exceeded;
enabling the Short message service center to determine whether the number of transmission times of the trigger SMS is larger than or equal to R; and
enabling the Short message service center repeatedly to transmit the trigger message in time period Δ when the Short message service center determines that the number of transmission times of the trigger SMS is not larger than or equal to R.

8. The method of providing a trigger service by an application service terminal as claimed in claim 7, wherein when the Short message service center determines that the valid transmission duration of the message sequence is exceeded, the Short message service center stops transmitting the trigger SMS; and
wherein when the Short message service center determines that the transmission times of the trigger SMS is larger than or equal to R, the Short message service center stops transmitting the trigger SMS.

9. The method of providing a trigger service by an application service terminal as claimed in claim 7, wherein the application service terminal uses the AS and the Short message service center to transmit the trigger SMS by the steps of:
configuring the AS to transmit a trigger service request to the Short message service center, and temporarily store the trigger service request in a transmission queue module;

configuring the Short message service center to determine whether a number of the subgroups of the trigger SMS is smaller than a total number of all subgroups;

configuring a new subgroup parameter and corresponding order to add on the trigger SMS and calculate the number of the subgroups of the trigger SMS when the Short message service center determines that the number of the subgroups of the trigger SMS is smaller than the total number of all subgroups;

enabling the Short message service center to determine whether any one of the subgroups exceeds a predetermined transmission time; and enabling the Short message service center to transmit the trigger SMS when the Short message service center determines that none of the subgroups exceeds a predetermined transmission.

10. The method of providing a trigger service by an application service terminal as claimed in claim 9, wherein when the Short message service center determines that the number of the subgroups of the trigger SMS is larger than or equal to total number of all subgroups, the Short message service center is configured to wait for the next message sequence: and wherein when the Short message service center determines that any subgroup has exceeded the predetermined transmission time, the Short message service center is configured to delete the parameter and corresponding order of the subgroup that exceeded the predetermined transmission time, calculate the number of the subgroups in the trigger SMS and then transmit the trigger SMS.

* * * * *